United States Patent
Smith

(10) Patent No.: US 10,314,413 B1
(45) Date of Patent: Jun. 11, 2019

(54) METHOD AND APPARATUS FOR CONVENTION POURING AND HOLDING OF CANDY FOODS

(71) Applicant: Tod Smith, Los Angeles, CA (US)

(72) Inventor: Tod Smith, Los Angeles, CA (US)

(*) Notice: Subject to any disclaimer, the term of this patent is extended or adjusted under 35 U.S.C. 154(b) by 0 days.

(21) Appl. No.: 16/016,728

(22) Filed: Jun. 25, 2018

(51) Int. Cl.
| | |
|---|---|
| A47F 7/00 | (2006.01) |
| A23G 3/02 | (2006.01) |
| A47F 5/11 | (2006.01) |
| A47B 75/00 | (2006.01) |
| A47G 19/30 | (2006.01) |

(52) U.S. Cl.
CPC .............. *A47F 7/0071* (2013.01); *A23G 3/02* (2013.01); *A47F 5/112* (2013.01); *A47B 75/00* (2013.01); *A47G 2019/306* (2013.01)

(58) Field of Classification Search
CPC ..... A47F 7/0071; A47F 5/112; B65D 5/5021; B65D 5/504; A23G 3/02; A47B 75/00; A47G 2019/306
USPC ...... 211/85.4, 14, 41.6, 45, 47, 70.1, 72, 73, 211/85, 195, 198, 200; 229/120.24, 229/120.26, 120.36, 120.38; 206/477, 206/478, 480, 482; 40/124.14–124.18; 248/174, 459, 300; D7/368, 669; D9/737, 761
See application file for complete search history.

(56) References Cited

U.S. PATENT DOCUMENTS

| | | | | |
|---|---|---|---|---|
| 53,055 | A * | 3/1866 | Stone | D06F 57/08 211/198 |
| RE3,710 | E * | 11/1869 | Stone | 211/200 |
| 222,542 | A * | 12/1879 | Stearns | D06F 57/08 211/200 |
| 516,907 | A * | 3/1894 | Barker | A47F 5/112 211/72 |
| 574,628 | A * | 1/1897 | Phillips | B62H 3/00 211/22 |
| 638,417 | A * | 12/1899 | Miller | D06F 57/08 211/200 |
| 680,450 | A * | 8/1901 | Aiken | A47F 7/175 211/181.1 |
| 1,104,004 | A * | 7/1914 | Rathbone | A24F 9/14 131/257 |
| 1,204,920 | A * | 11/1916 | Williamson | A47F 5/112 211/72 |

(Continued)

*Primary Examiner* — Jonathan Liu
*Assistant Examiner* — Devin K Barnett
(74) *Attorney, Agent, or Firm* — Cotman IP Law Group, PLC

(57) ABSTRACT

A method and apparatus for convention pouring and holding of candy foods are presented. The invention includes a first body panel with an inner section and an outer section, with the inner section of the first body panel having one or more first body panel members of a support structure. The invention further includes a second body panel with an inner section and an outer section, with inner section of said second body panel having one or more second body panel members of the support structure. The inner section of the first body panel and the inner section of said second body panel are coupled together such that the one or more first body panel members of the support structure and the one or more second body panel members of the support structure combine to form the one or more support structures for holding light foods.

3 Claims, 6 Drawing Sheets

(56) References Cited

U.S. PATENT DOCUMENTS

| | | | | |
|---|---|---|---|---|
| 1,546,983 A * | 7/1925 | House | B65D 73/0085 | 211/73 |
| 1,572,340 A * | 2/1926 | Warren | A47F 7/17 | 211/149 |
| 1,586,637 A * | 6/1926 | Myers | B65D 5/504 | 206/482 |
| 1,726,732 A * | 9/1929 | Doran | B65D 5/504 | 206/3 |
| 1,827,731 A * | 10/1931 | Churchill | A47F 5/112 | 211/70.1 |
| 1,930,311 A * | 10/1933 | Gittleman | G09F 5/042 | 206/278 |
| 2,102,982 A * | 12/1937 | Taylor | A47F 5/025 | 211/1.53 |
| 2,252,571 A * | 8/1941 | Kohn | A47G 1/141 | 248/459 |
| 2,656,917 A * | 10/1953 | Hollis | G09F 5/042 | 206/482 |
| 2,681,733 A * | 6/1954 | Welshenbach | B65D 5/504 | 206/453 |
| 2,711,246 A * | 6/1955 | Brooks | B65D 73/0007 | 206/478 |
| 2,726,835 A * | 12/1955 | Hummel | A47F 5/112 | 211/73 |
| 2,796,213 A * | 6/1957 | Shanahan | B65D 5/48034 | 229/120.16 |
| 2,888,134 A * | 5/1959 | Van Antwerpen | B65D 5/504 | 206/448 |
| 2,958,424 A * | 11/1960 | Bigatti | A47L 19/00 | 211/104 |
| 3,013,668 A * | 12/1961 | Mennen | A47F 5/112 | 211/195 |
| 3,101,166 A * | 8/1963 | Van Antwerpen | B65D 5/504 | 206/454 |
| 3,311,232 A * | 3/1967 | Howell | B65D 5/504 | 206/443 |
| 3,516,538 A * | 6/1970 | Van Antwerpen | B65D 5/504 | 206/453 |
| 3,726,412 A * | 4/1973 | Resnicoff | A47F 5/112 | 211/135 |
| 4,181,220 A * | 1/1980 | Zicko | B65D 5/5035 | 206/315.2 |
| 4,212,400 A * | 7/1980 | Buchsteiner | A47L 19/04 | 211/200 |
| 4,896,820 A * | 1/1990 | Harrington | A47G 19/30 | 211/73 |
| 4,996,404 A * | 2/1991 | Skerker | H05B 6/6408 | 211/195 |
| 5,367,127 A * | 11/1994 | Dormon | F16L 3/22 | 174/146 |
| 5,641,137 A * | 6/1997 | Collier | F26B 21/008 | 211/12 |
| 6,056,120 A * | 5/2000 | Hollingsworth | A47F 5/11 | 206/562 |
| 6,170,676 B1 * | 1/2001 | Patadia | A47L 19/04 | 211/41.3 |
| 6,269,961 B1 * | 8/2001 | Porcelli | A47F 5/112 | 211/70.7 |
| D470,360 S * | 2/2003 | Stanco | | 211/85.4 |
| 7,475,785 B1 * | 1/2009 | Kidd | A47L 19/02 | 211/200 |
| 8,156,861 B1 * | 4/2012 | Prokopow | A47J 43/18 | 211/200 |
| 8,960,452 B2 * | 2/2015 | Rhodes, II | A47L 19/04 | 211/41.6 |
| 2007/0210019 A1 * | 9/2007 | Schnitzer | A47L 19/04 | 211/41.6 |
| 2008/0149644 A1 * | 6/2008 | Piacenza | A47L 19/04 | 220/572 |
| 2008/0283480 A1 * | 11/2008 | Segall | A47L 19/02 | 211/41.6 |
| 2011/0114522 A1 * | 5/2011 | Alston | A61B 50/22 | 206/370 |
| 2013/0168287 A1 * | 7/2013 | James | B65D 5/5021 | 206/763 |
| 2014/0246392 A1 * | 9/2014 | McClain | A47G 23/02 | 211/85 |
| 2015/0250335 A1 * | 9/2015 | Waksul | A47B 81/04 | 211/85.4 |

* cited by examiner

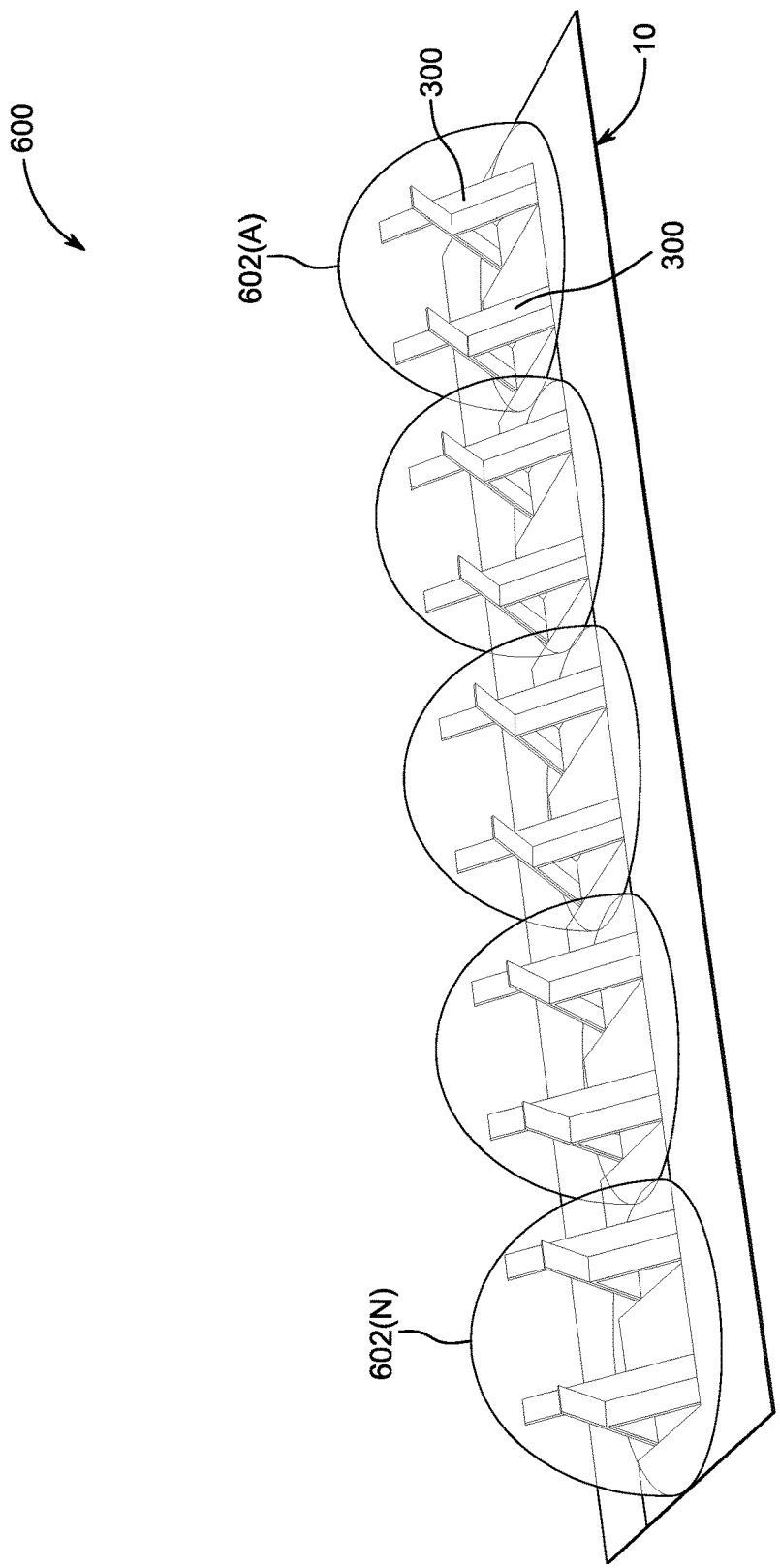

METHOD AND APPARATUS FOR CONVENTION POURING AND HOLDING OF CANDY FOODS

BACKGROUND OF THE INVENTION

Field of the Invention

Embodiments of the invention relates to the field of holders for foods. More specifically, the invention relates to method and apparatus for convention pouring and holding of candy foods.

BRIEF SUMMARY OF THE INVENTION

One or more embodiments of the invention are directed a method and apparatus for convention pouring and holding of candy foods. The food holder comprises a first body panel with an inner section and an outer section. In one or more embodiments, the inner section of the first body panel comprises one or more first body panel members of a support structure.

In one or more embodiments, the food holder further comprises a second body panel with an inner section and an outer section. The inner section of said second body panel comprises one or more second body panel members of the support structure.

In one or more embodiments, the inner section of said first body panel and the inner section of said second body panel are coupled together such that the one or more first body panel members of the support structure and the one or more second body panel members of the support structure abuts such that the combination results in the one or more support structures.

In one or more embodiments, the one or more first body panel members of the support structure comprises a prop member and an adjacent support arm. The one or more first body panel members of the support structure are separated by a spacing element.

In one or more embodiments, the one or more second body panel members of the support structure comprises a support arm and an adjacent prop member. The one or more second body panel members of the support structure are separated by a spacing element.

In one or more embodiments, a prop member of the first body panel is configured to hold up and support a corresponding support arm of the second body panel, and a prop member of the second body panel is configured to hold up and support a corresponding support arm of the first body panel.

BRIEF DESCRIPTION OF THE DRAWINGS

The above and other aspects, features and advantages of the invention will be more apparent from the following more particular description thereof, presented in conjunction with the following drawings wherein:

FIG. 6 is an illustration of the food holder apparatus with each food item held by two support structures in accordance with one or more embodiments of the present invention.

DETAILED DESCRIPTION

Figure 1:
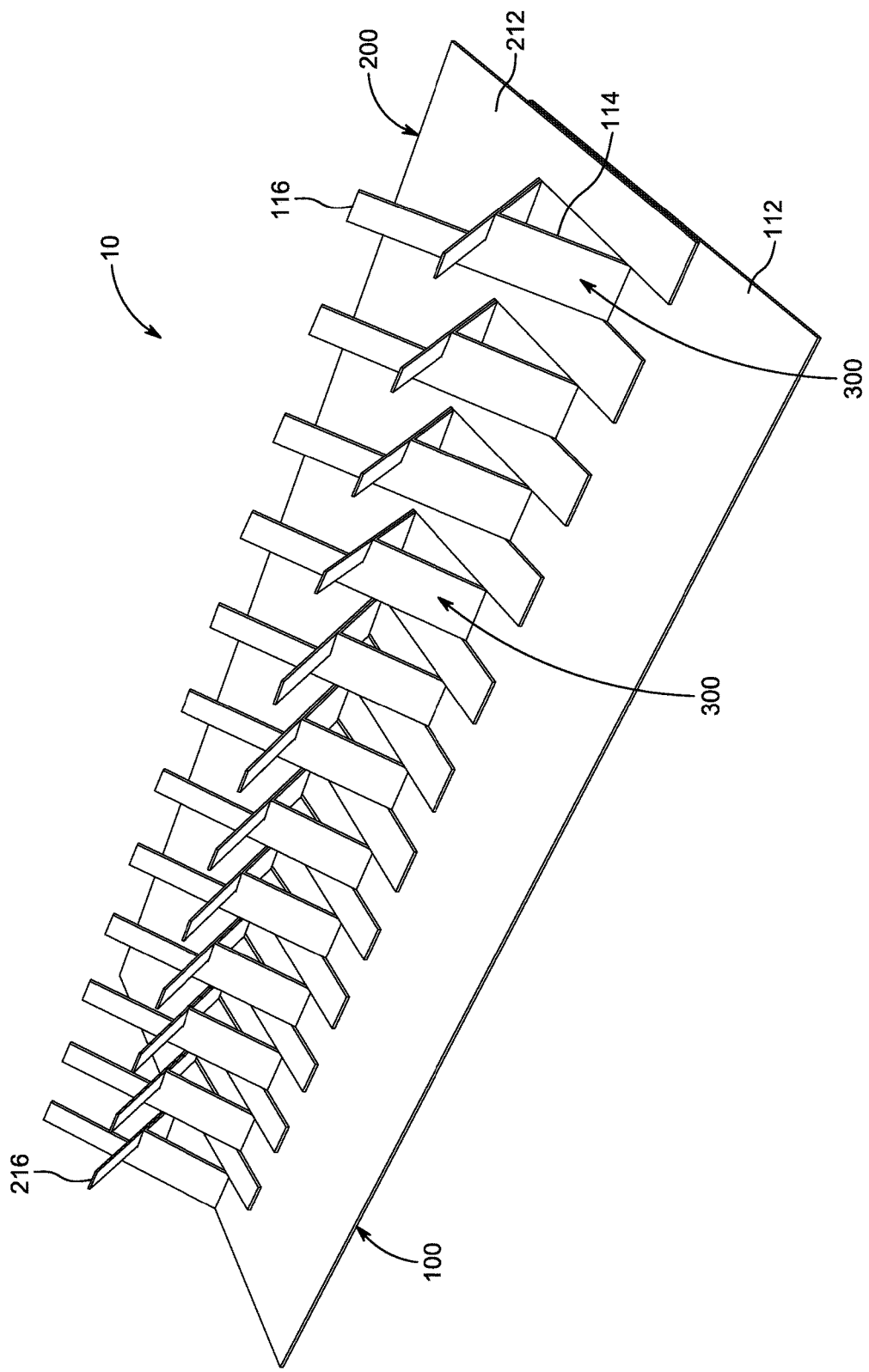
FIG. 1 is a top perspective view of the food holder apparatus in accordance with one or more embodiments of the present invention.

The present invention comprising method and apparatus for convention pouring and holding of candy foods will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present invention will now be described with references to FIGS. 1-6.

Figure 2:
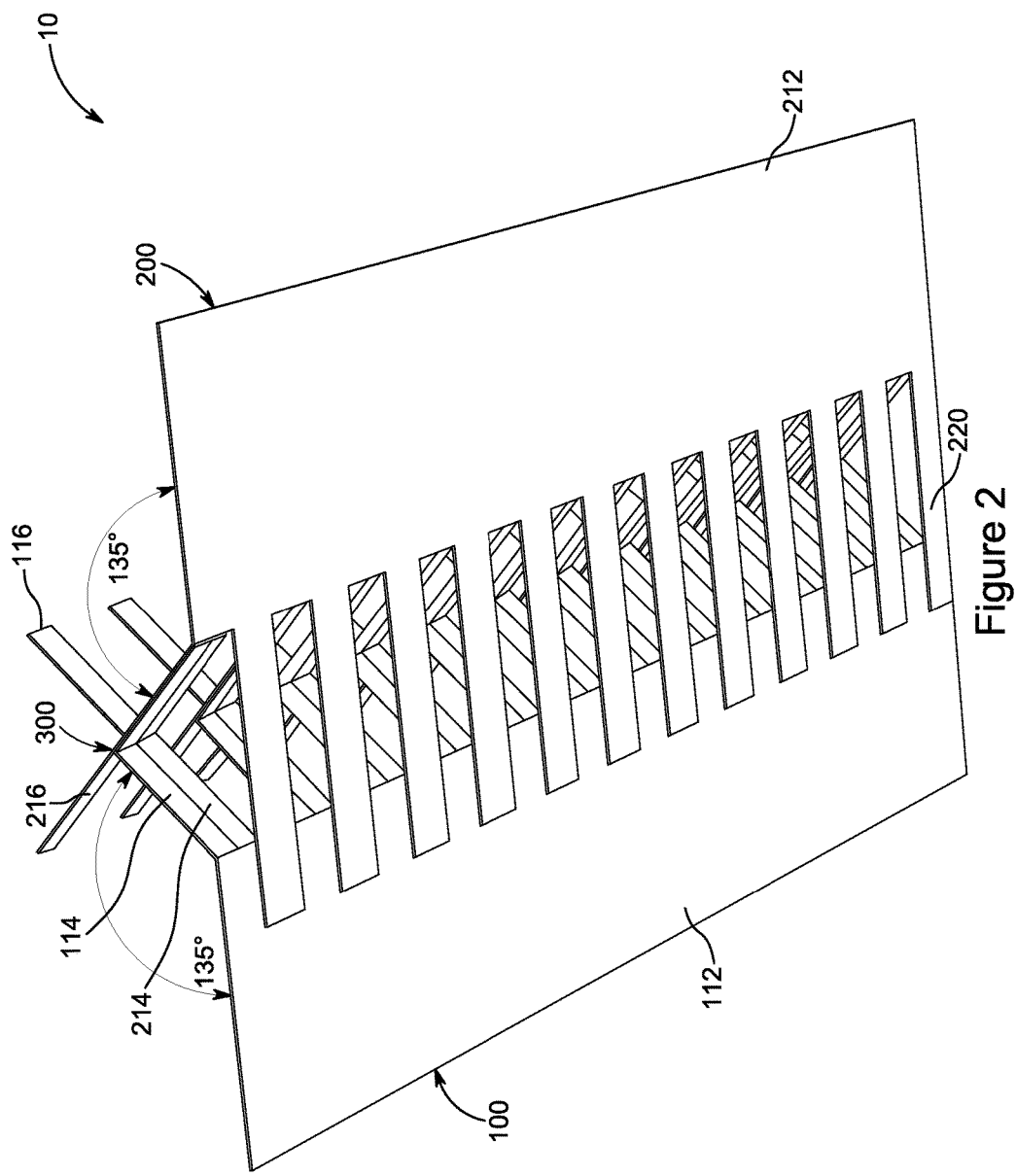
FIG. 2 is a bottom perspective view of the food holder apparatus in accordance with one or more embodiments of the present invention.
Figure 3:
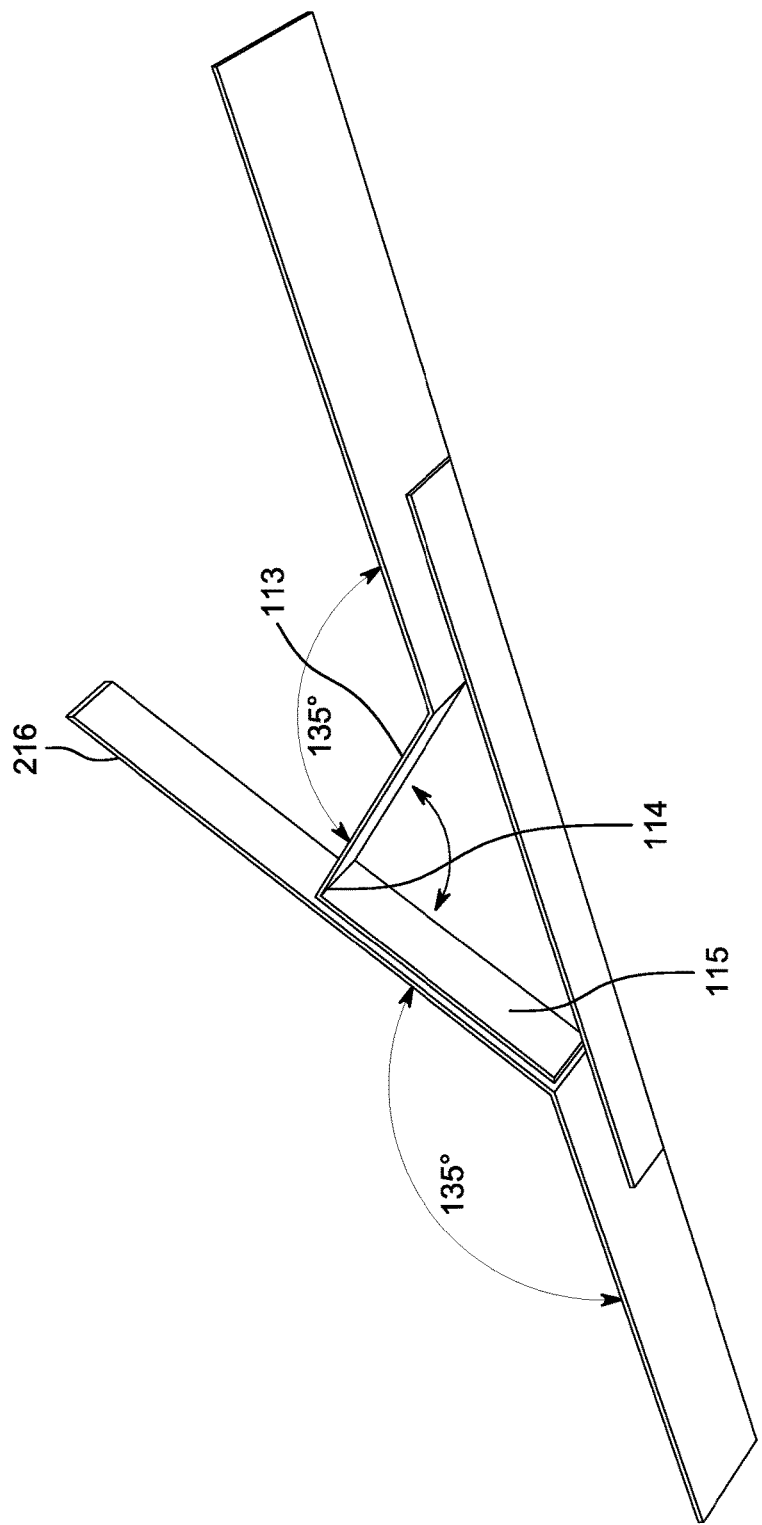
FIG. 3 is a detailed illustration of a single support structure of the food holder apparatus in accordance with one or more embodiments of the present invention.

FIGS. 1 to 2 illustrate the food holder apparatus 10 in accordance with one or more embodiments of the present invention. In one or more embodiments of the present invention, food holder 10 comprises two panels: first body panel 100 and second body panel 200. Holder 10 may be made from two separate panels 100 and 200 or from one foldable material to form the two panels. Holder 10 may comprise any sheet-like material, such as paper, cardboard, fabric, plastic, vinyl, or any other suitable sheeting material capable of holding candy foods. In a preferred embodiment, body panels 100 and 200 are rectangular in shape.

Figure 4:
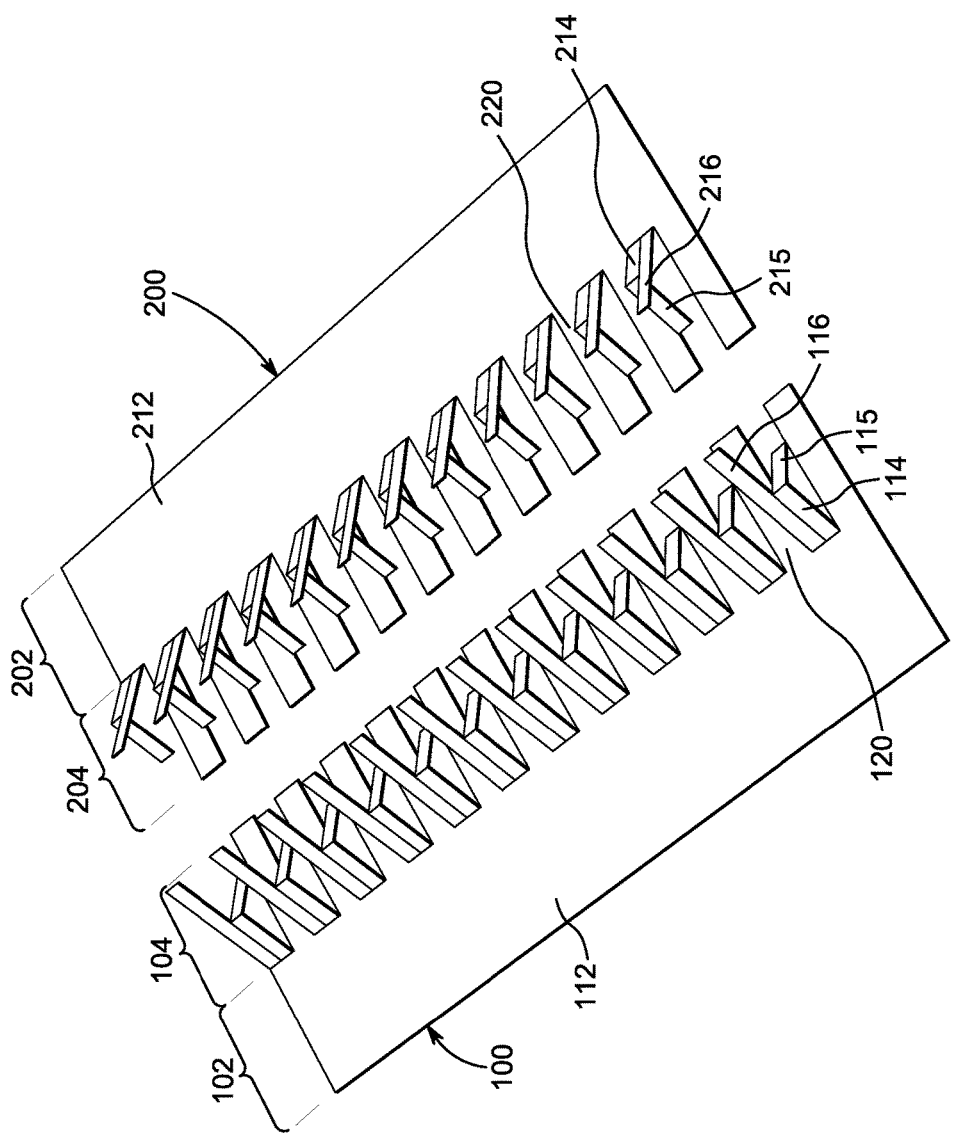
FIG. 4 is an exploded view of the food holder apparatus in accordance with one or more embodiments of the present invention.

The first body panel 100 of holder 10 comprises an outside section 102 and an inner section (i.e. opposing end) 104. The inner section 104 comprises one or more first panel members of a support structure 300. Each first panel member of the support structure 300 comprises a combination of a prop member 114 followed by an adjacent support arm 116. In one or more embodiments, a spacing member 120 separates consecutive first panel members of a support structure 300. As illustrated in FIG. 4, beginning from the bottom, the inner section of first body panel 100 comprises a prop member 114, followed by an adjacent support arm 116, followed by an adjacent spacing member 120; followed by a second prop member 114, a second support arm 116, and a second spacing member 120, and so on, until the desired number of support structures 300 is reached.

In one or more embodiments, prop member 114 comprises a base member 113 that rises from the base of the body panel 110 at an internal angle of about 45 degrees (i.e. external angle of about 135 degrees) from the horizontal, followed by a support section 115 extending downwards at an angle of about 90 degrees from the top of the base member 113. Each prop member 114 is configured to provide support for a corresponding support arm 216 of the second panel.

In one or more embodiments, the internal angles of the components of the prop member 114 may vary between 10 degrees and 80 degrees. For instance, the internal angle could be 10, 15, 20, 25, 30, 35, 40, 45, 50, 55, 60, 65, 70, 75, 80 degrees or ranges including and/or spanning the aforementioned values. In a preferred embodiment, the internal angle is greater than 35 degrees.

In one or more embodiments, support arm 116 comprises a slender structure that rises from the base of the panel at an internal angle of about 45 degrees (i.e. external angle of about 135 degrees) from the horizontal and extending beyond the top of the base member 113. Each support arm 116 is configured to be supported by a corresponding prop member 214 of the second body panel 200.

In one or more embodiments, the internal angle of the support arm 116 may vary between 10 degrees and 80 degrees. For instance, the internal angle could be 10, 15, 20, 25, 30, 35, 40, 45, 50, 55, 60, 65, 70, 75, 80 degrees or ranges including and/or spanning the aforementioned values. In a preferred embodiment, the internal angle is greater than 35 degrees.

For ease of manufacture, holder 10 preferably comprises any rectangular foldable and durable material capable of holding light food items during convention pouring.

The second panel 200 of holder 10 comprises an outside section 202 and an inner section (i.e. opposing end) 204. The inner section 204 comprises one or more second panel members of the support structure 300. Each second panel member of the support structure 300 comprises a combination of a support arm 216 followed by an adjacent prop member 214. In one or more embodiments, spacing member 220 separates consecutive second panel members of a support structure 300. As illustrated in FIG. 4, beginning from the bottom, the inner section 204 of second panel 200 comprises a support arm 216, followed by an adjacent prop member 214, followed by an adjacent spacing member 220; followed by a second support arm 216, a second prop member 214, and a second spacing member 220, and so on, until the desired number of support structures 300 is reached.

In one or more embodiments, prop member 214 comprises a base member 213 that rises from the base of the panel at an internal angle of about 45 degrees (i.e. external angle of about 135 degrees) from the horizontal, followed by a support section 215 extending downwards at an angle of about 90 degrees from the top of the base member 213. Each prop member 214 is configured to provide support for a corresponding support arm 116 of the first body panel.

In one or more embodiments, the internal angles of the components of the prop member 214 may vary between 10 degrees and 80 degrees. For instance, the internal angle could be 10, 15, 20, 25, 30, 35, 40, 45, 50, 55, 60, 65, 70, 75, 80 degrees or ranges including and/or spanning the aforementioned values. In a preferred embodiment, the internal angle is greater than 35 degrees.

In one or more embodiments, support arm 216 comprises a slender structure that rises from the base of the panel at an internal angle of about 45 degrees (i.e. external angle of about 135 degrees) from the horizontal and extending beyond the top of the base member 213. Each support arm 216 is configured to be supported by a corresponding prop member 114 of the first body panel.

In one or more embodiments, the internal angle of the support arm 216 may vary between 10 degrees and 80 degrees. For instance, the internal angle could be 10, 15, 20, 25, 30, 35, 40, 45, 50, 55, 60, 65, 70, 75, 80 degrees or ranges including and/or spanning the aforementioned values. In a preferred embodiment, the internal angle is greater than 35 degrees.

In one or more embodiments, the first body panel 100 and the second body panel 200 are coupled together at the inner section 104 of first body panel 100 and inner section 204 of second body panel 200 such that support arm 216 of second body panel 200 abuts or lies on top of the outside face of support section 115 of prop member 114 of first body panel 100; and support arm 116 of first body panel 100 abuts or lies on top of the outside face of support section 215 of prop member 214 of second body panel 200. In some embodiments, the spacing member 120 of the first body panel 100 and spacing member 220 of the second body panel 200 overlap.

In one or more embodiments, the first body panel 100 and the second body panel 200 are coupled together using some type of fastener. For instance, the fastener could be glue, staples, etc. In some embodiments, there is no fastener used to hold the first and second body panels together.

The paired panel configuration is advantageous production of slope anchored foods such as candy and chocolate. For instance, pouring food for volume productions this takes less labor time due the body 10 being a sheet that includes support elements.

Figure 5:
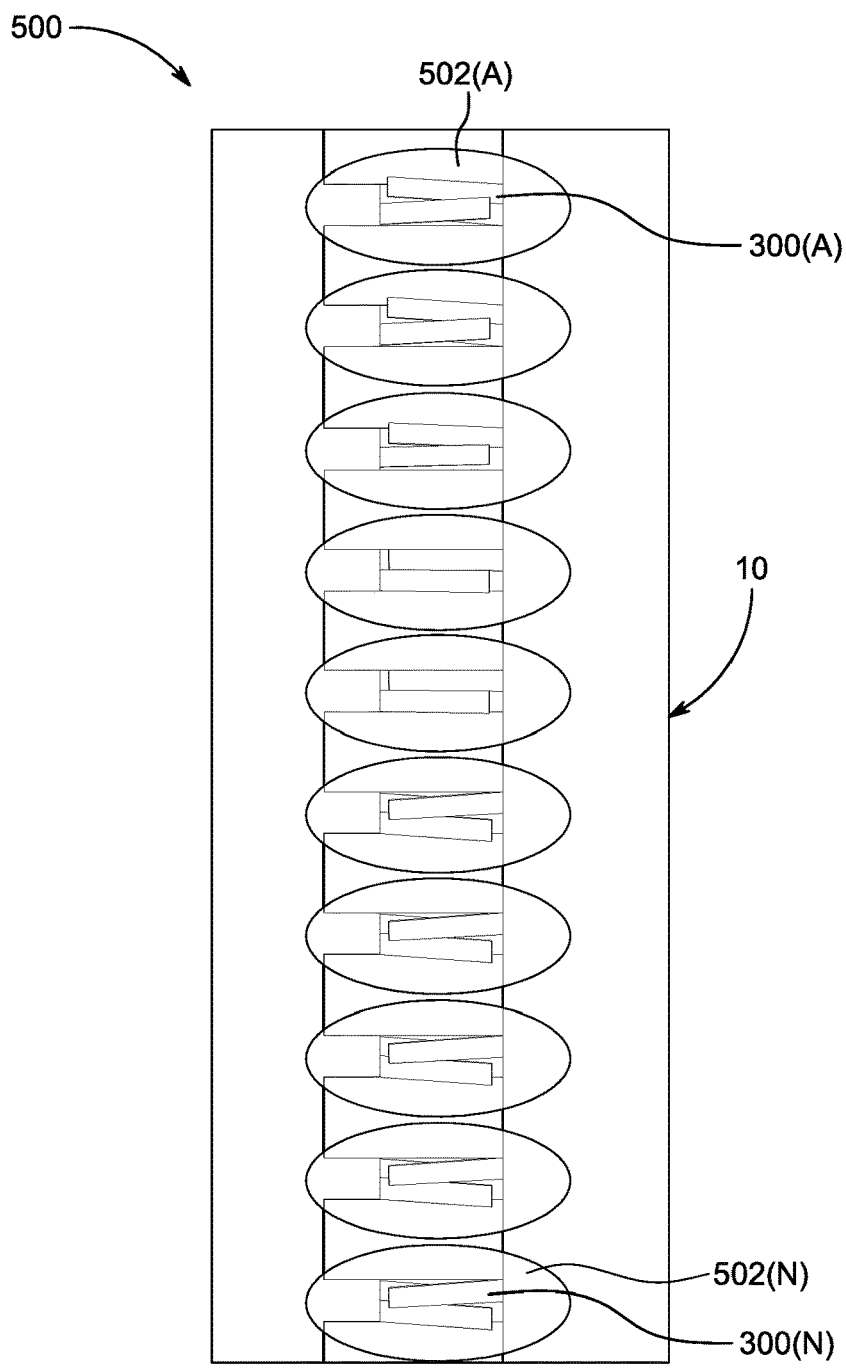
FIG. 5 is an illustration of the food holder apparatus with each food item held by a single support structure in accordance with one or more embodiments of the present invention.

FIG. 5 is an illustration of the food holder apparatus 500 with each food item held by a single support structure in accordance with one or more embodiments of the present invention. As illustrated, one or more embodiments of the food holder 10 is configured such that each instance of the convection food 502 may be poured over a single support structure 300 during production of light foods such as candy and chocolate. Each support structure, e.g. 300(A) . . . (N), is configured to hold and support each instance of the convection food, e.g. 502(A) . . . (N).

FIG. 6 is an illustration of the food holder apparatus 600 with each food item held by two support structures in accordance with one or more embodiments of the present invention. As illustrated, one or more embodiments of the food holder 10 is configured such that each instance of the convection food 602 may be poured over two or more support structures 300 during production of light foods such as candy and chocolate. In the illustrated example, two support structures 300 are configured to hold and support one instance of the convection food, e.g. 602(A) . . . (N).

While the invention herein disclosed has been described by means of specific embodiments and applications thereof, numerous modifications and variations could be made thereto by those skilled in the art without departing from the scope of the invention set forth in the claims.

What is claimed is:

1. A food holder comprising:
   a first panel having a first inner section and a first outer section, the first outer section is planar;
   wherein the first inner section has at least one first support structure, each first support structure comprises a first support arm and a first prop member, each first support arm is inclined upwardly relative to the first outer section, wherein each first support arm has a lower end, an upper end, a pair of opposed sides, a top surface, and a bottom surface;
   wherein each first prop member abuts one of the sides from said pair of opposed sides of each first support arm respectively; each first prop member has a first proximal end, a first mid section, and a first distal end, wherein each first proximal end is inclined upwardly relative to the first outer section, each first mid section has a first apex, and each first distal end is inclined downwardly relative to each first apex respectively;
   a second panel having a second inner section and a second outer section, the second outer section is planar;
   wherein the second inner section has at least one second support structure, each second support structure comprises a second support arm, each second support arm is inclined upwardly relative to the second outer section, wherein each second support arm has a lower edge, an upper edge, and a pair of opposed side edges, an upper side surface, and a lower side surface;
   wherein said first inner section of said first panel and said second inner section of said second panel are removably coupled together such that a corresponding first prop member from said at least one first support structure abuts a corresponding lower side surface of a corresponding second support arm from said at least one second support structure to support said corresponding second support arm and a corresponding first support arm from said at least one first support structure combines with said corresponding second support arm to form a generally X-shaped holding member; wherein the generally X-shaped holding member is configured to hold a food item thereon.

2. The food holder of claim 1,
   wherein a first spacing member is located between each first support structure respectively to separate each first support structure; wherein a second spacing member is located between each second support structure respectively to separate each second support structure.

3. The food holder of claim 2,
   wherein each second support structure further comprises a second prop member, wherein each second prop member abuts one of the side edges from said pair of opposed side edges of each second support arm respectively; each second prop member has a second proximal end, a second mid section, and a second distal end, wherein each second proximal end is inclined upwardly relative to the second outer section, each second mid section has a second apex, and each second distal end is inclined downwardly relative to each second apex respectively;
   wherein a corresponding second prop member from said at least one second support structure abuts a corresponding bottom surface of said corresponding first support arm from said at least one first support structure to support said corresponding first support arm.

* * * * *